United States Patent [19]

Farag et al.

[11] Patent Number: 4,781,627
[45] Date of Patent: Nov. 1, 1988

[54] BUS BAR STAB AND INSULATOR ASSEMBLY

[75] Inventors: Samir F. Farag; John D. Kleinecke; Thomas R. Little, all of Wichita Falls, Tex.

[73] Assignee: Siemens-Allis, Atlanta, Ga.

[21] Appl. No.: 821,617

[22] Filed: Jan. 23, 1986

[51] Int. Cl.$^4$ ................................ H01R 4/48
[52] U.S. Cl. .................... 439/687; 439/689; 439/856
[58] Field of Search .......... 339/191 M, 191 R, 191 A, 339/191 S, 22 B, 198 J, 196 R, 196 M, 198 R, 206 R, 206 P, 210 M, 198 H; 439/682, 683, 684, 685, 686, 687, 688, 689, 690, 691, 692, 856

[56] References Cited

U.S. PATENT DOCUMENTS

| | | | |
|---|---|---|---|
| 1,595,003 | 8/1926 | Downing | 439/687 |
| 1,630,166 | 5/1927 | Catlin et al. | 339/196 M |
| 2,073,880 | 3/1937 | Robinson | 339/191 R |
| 3,002,177 | 9/1961 | Bundy | 339/198 J |
| 3,088,091 | 4/1963 | Linn | 339/196 M |
| 3,356,986 | 12/1967 | Ege | 439/685 |
| 3,701,084 | 10/1972 | Gomez | 339/196 M |
| 3,778,748 | 12/1973 | Holman | 339/64 M |
| 3,848,951 | 11/1974 | Michaels et al. | 339/91 R |
| 4,432,036 | 2/1984 | Zwillich | 361/337 |

FOREIGN PATENT DOCUMENTS

| | | | |
|---|---|---|---|
| 1367654 | 6/1964 | France | 339/191 M |
| 1282403 | 7/1972 | United Kingdom | 339/196 M |

*Primary Examiner*—John McQuade
*Attorney, Agent, or Firm*—James G. Morrow

[57] ABSTRACT

A bus bar stab and insulator assembly for a motor controller has a two-piece housing and a three-piece stab finger clip. The housing base has a number of partitions which define pathways for the stab fingers. The housing cover is slidably mateable with the base and has a tab for receiving a self tapping screw. The stab fingers extend from the housing for making contact with bus bars. The stab finger clip has two fingers with interlocking tabs secured together with a screw which also connects one or more connector cables to the clip. The fingers are constructed of copper alloy and do not require the use of springs.

18 Claims, 5 Drawing Sheets

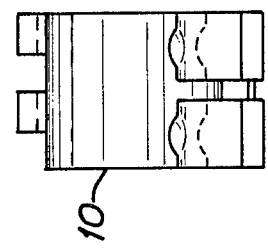
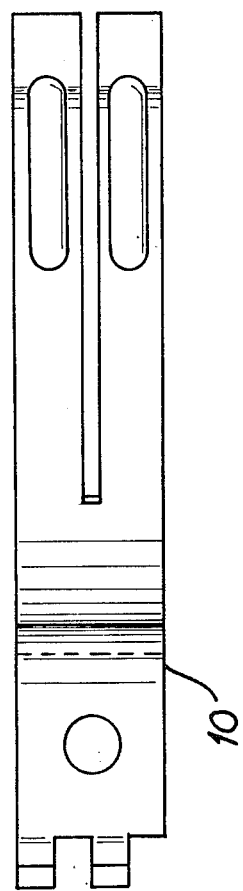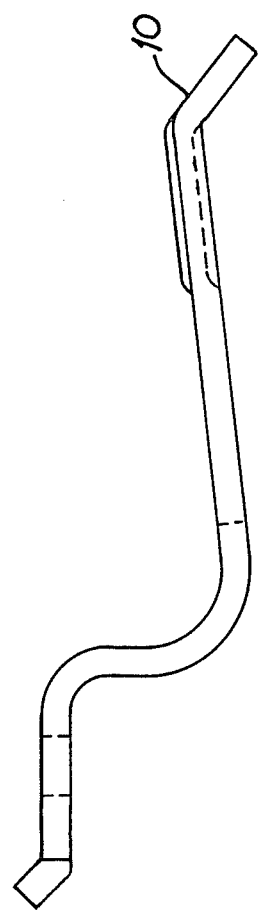
Fig 5
Fig 4
Fig 3

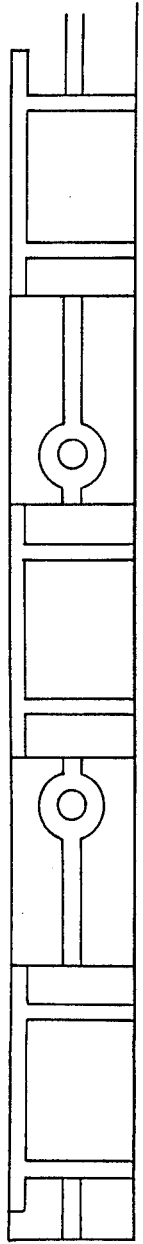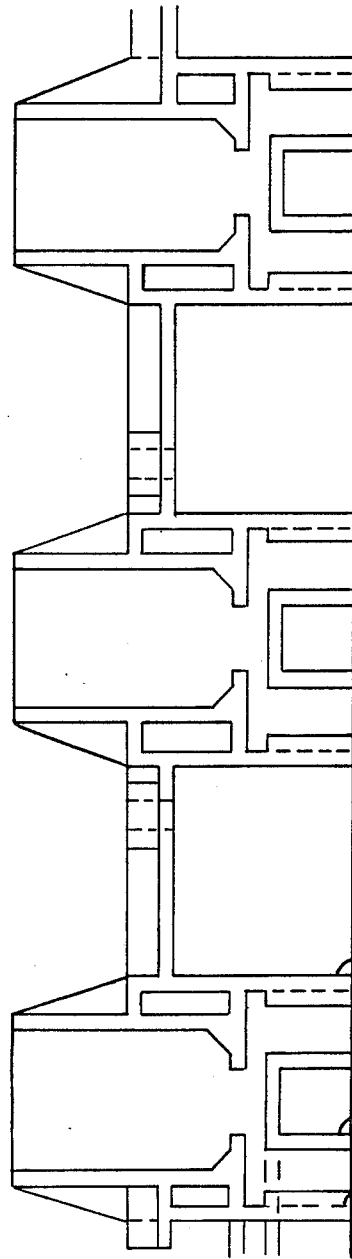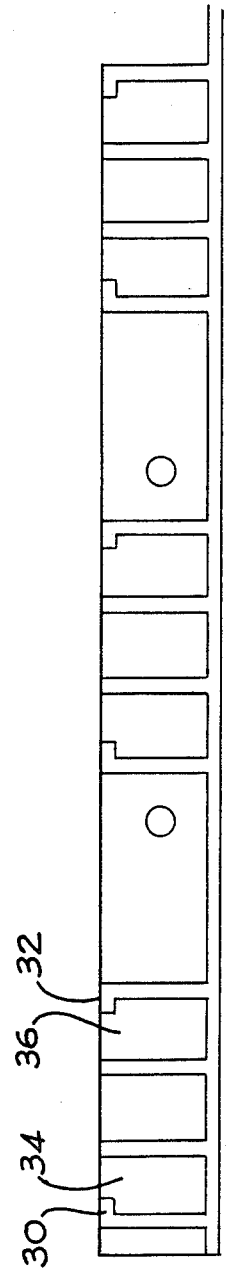

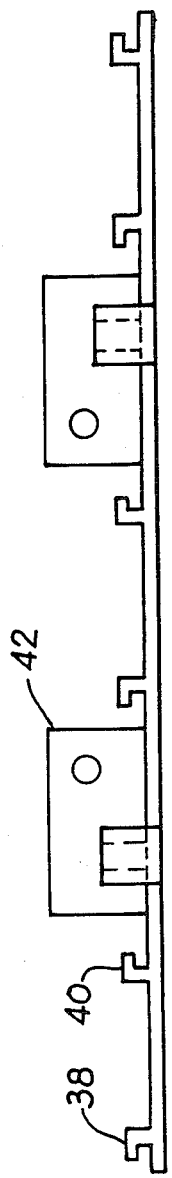
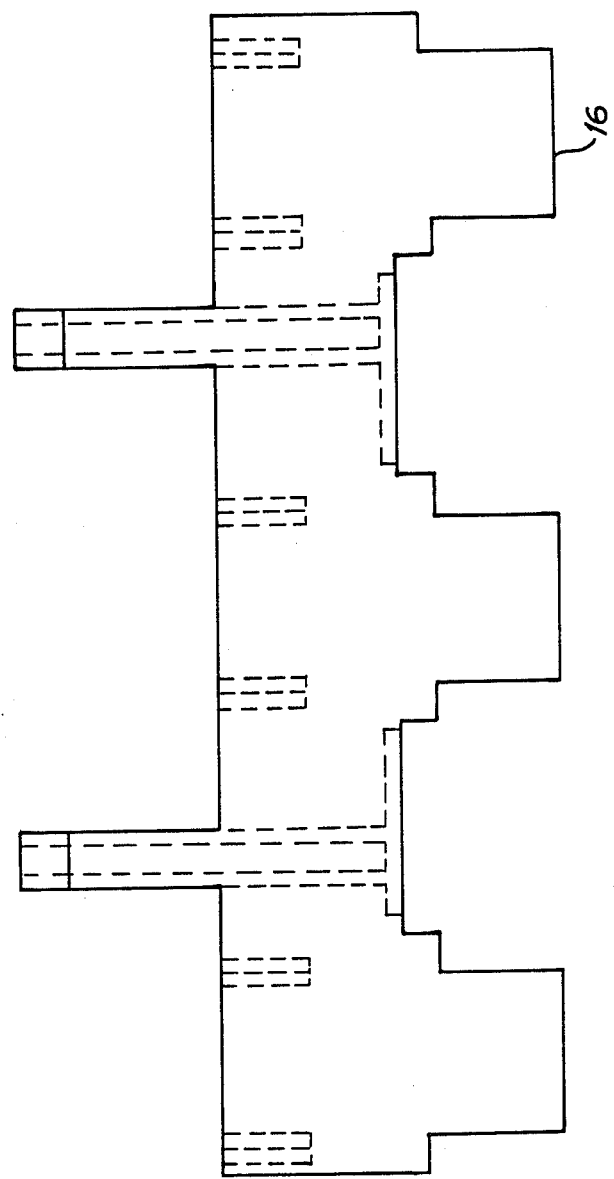
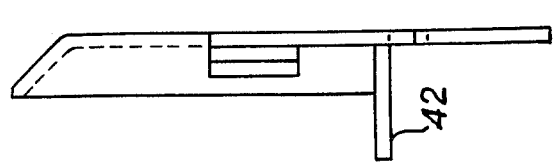

BUS BAR STAB AND INSULATOR ASSEMBLY

CROSS-REFERENCE TO RELATED APPLICATIONS

The subject matter described in this application is related to the material disclosed in copending patent application Ser. No. 821,703 "Shutter Assembly For A Motor Controller"—John D. Kleinecke, Samir F. Farag and Thomas R. Little, now U.S. Pat. No. 4,688,144.

BACKGROUND OF THE INVENTION

This invention pertains to a bus bar stab assembly for a motor control center and more particularly to a stab assembly and an insulated housing for the stab assembly.

Electrical apparatus, such as a motor control center, often has a draw-out type protective device which can be racked-in and racked-out of the control center enclosure to facilitate maintenance, testing and installation. The draw-out protective device, which may be a fusible disconnect switch or a circuit breaker, is typically mounted on a carriage assembly which can be racked-out and put racked-in the control center housing. This requires the making and breaking of contact between the protective device mechanism itself and current carrying conductors in the enclosure. A stab assembly is used to make the connection between the draw-out protective device and the bus bars.

Typical stab connector arrangements are illustrated in U.S. Pat. Nos. 3,778,748 and 4,432,036. The stab assemblies usually have fingers which incorporate springs to make the fingers resilient and to facilitate contact with the bus bars. The use of springs reduces the need for precise alignment of the stab fingers and the bus bars, but the use of springs increases the number of parts required for each stab connector. In a manufacturing operation, it is desirable to reduce the number of parts and to reduce the number of assembly steps required to assemble a completed unit. The reduction of assembly steps and parts reduces the overall labor costs and enables the stab connector to be made more economically. Accordingly, it will be appreciated that it will be highly desirable to provide a stab connector which is easy to assemble and which has a relatively small number of parts.

Accordingly, it is an object of the present invention to provide a bus bar stab assembly for making connection between a draw-out protective device and a bus bar.

Another object of the invention is to provide a bus bar stab assembly which has relatively few parts.

Another object of the invention is to provide a stab assembly which can be easily assembled.

SUMMARY OF THE INVENTION

Briefly stated, in accordance with one aspect of the invention, the foregoing objects are achieved by providing a bus bar stab assembly which has first and second stab fingers. The first stab finger has first and second end portions with the first end portion having an opening therein and a tab extending therefrom in a first direction. The second stab finger has first and second end portions with the first end portion having an opening therein and a tab extending therefrom in a second direction opposite the first direction. A screw extends through the openings with the tabs in interlocking engagement.

In another aspect of the invention, a bus bar stab and insulator assembly has a stab housing base and a stab housing cover. The stab housing base has a group of first, second and third upstanding partitions formed thereon. The first partition has a shoulder thereon opposite the base extending from the first partition toward the third partition. The third partition has a shoulder thereon opposite the base extending from the third partition toward the first partition. The second partition is positioned between the first and third partitions and defines pathways between the first and second partitions and between the second and third partitions. The housing cover has a group of first and second spaced apart channels formed thereon. The first channel has a first portion connected to and extending from the cover and a second portion extending from the first portion toward the shoulder of the first partition of the housing. The shoulder slidingly engages the first channel for relative sliding motion between the stab housing base and cover. The second channel has a first portion connected to and extending from the cover and a second portion extending from the first portion towards the shoulder of the first partition of the housing. The shoulder slidingly engages the second channel for relative sliding motion between the stab housing base and cover.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

FIG. 2 illustrates a stab connector clip showing the stab fingers and conductor cable attached to the clip;

FIG. 3 is a somewhat enlarged plan view of a single stab finger;

FIG. 4 is a top view of the stab finger illustrated in FIG. 3 showing the bifurcated end portions;

FIG. 5 is an end view of the stab finger showing in FIG. 3;

FIG. 8 is a bottom view of the stab housing illustrated in FIG. 7;

FIG. 9 is a top view of the stab housing illustrated in FIG. 7;

FIG. 10 is a top view of a cover of the stab housing of FIG. 9 cover;

FIG. 11 is a top view of the stab housing cover illustrated in FIG. 10; and

FIG. 12 is an end view of the stab housing cover illustrated in FIG. 10.

DESCRIPTION OF A PREFERRED EMBODIMENT

Figure 1:
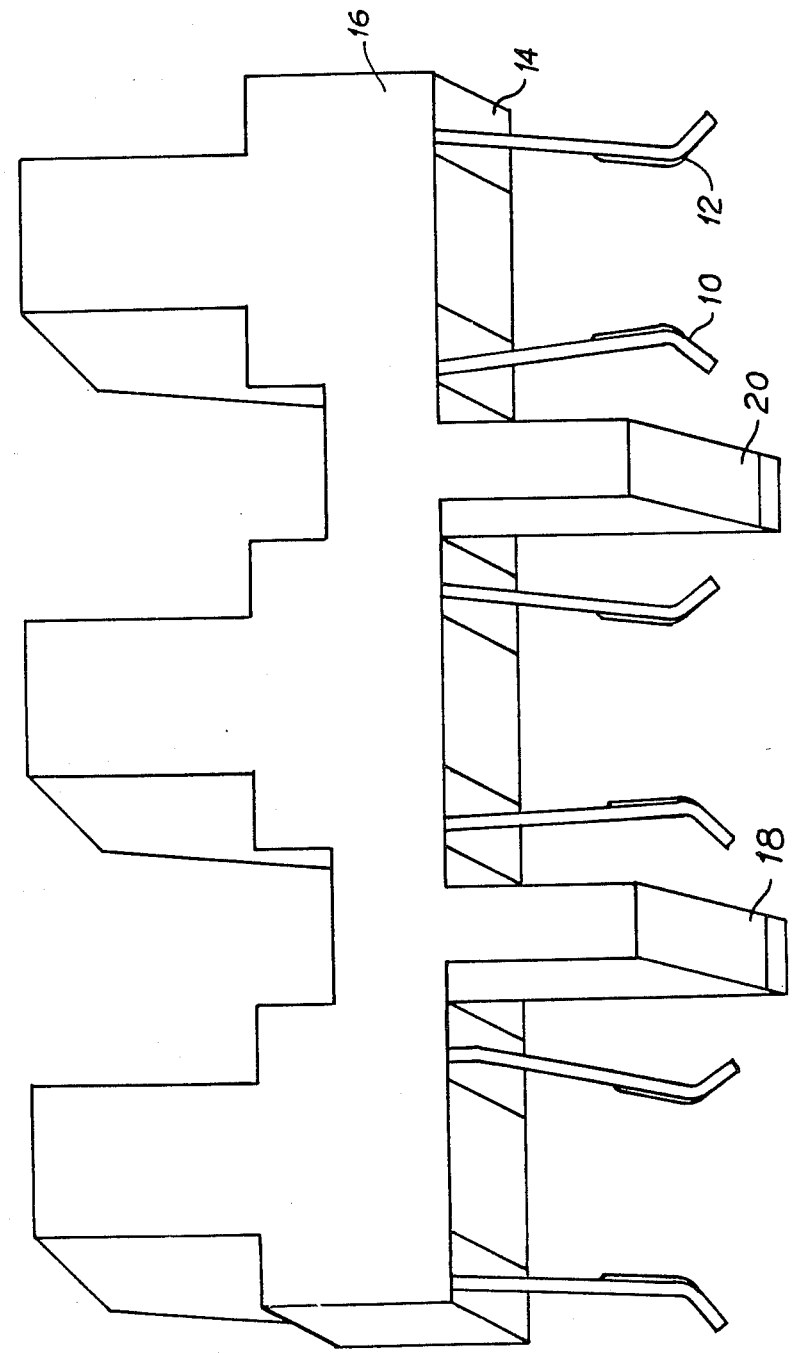
FIG. 1 is an isometric view of an assembled stab and insulator assembly in accordance with the invention with the stabs encased in the stab housing base and cover.

Referring to FIG. 1, a stab assembly for a motor control center or the like includes first and second stab fingers 10, 12 which protrude through openings in the base 14 of the housing. A housing cover 16 attaches to the base partially enclosing the stab fingers 10, 12. One or more conductors exit from the rear of the housing for connection to the circuit breaker device. The three-phase version of the stab assembly as illustrated in FIG. 1 also includes first and second shutter operating fingers 18, 20 which operate a shutter mechanism when the stab assembly is pushed in to establish electrical connection between the bus bars and the protective device. The shutter device is more fully described in the above-mentioned copending patent application Ser. No. 821,703 which is incorporated herein by reference.

Referring now to FIGS. 2 through 5, the first stab finger 10 and second stab finger 12 have first and second end portions. The first end portion of each stab 10, 12 has an opening 54 therein for receiving a screw 22 and two tabs 50, 52 extending therefrom in a first direction. The second end portions of each of the stab fingers are preferably bifurcated to form two contact legs. Each contact leg has a rib or contact thereon which faces in the direction of the respective tab. The stab fingers are preferably constructed of tempered copper alloy to provide a spring effect for insuring positive electrical contact with the bus bars. In the assembled position, the screw 22 extends through the stab finger openings 54 and the tabs 50, 52 are engaged in interlocking engagement. By this construction, the stab fingers 10, 12 are made operable so that they may engage and disengage the bus bars.

Figure 6:
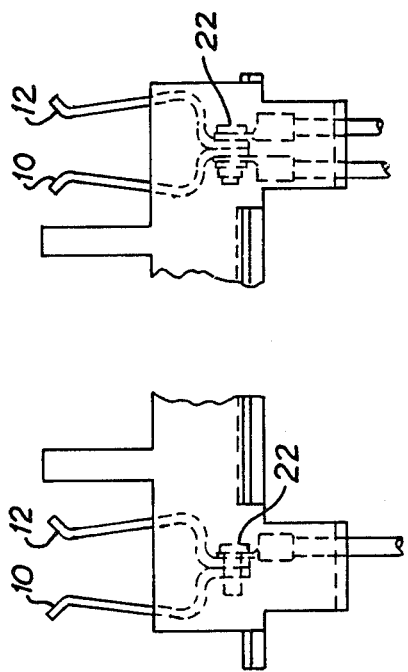
FIG. 6 illustrates a stab connector assembly with varying current carrying capabilities.

Each stab finger may also contain a portion on its second end portion which extends away from the contact surface. The purpose of this extension is to provide a larger opening to make the contact with the bus bars easier. This will eliminate the need for precise alignment of the fingers. The bifurcated stab fingers 10, 12 provide adequate contact area for use at varying current levels. Different current capabilities for the stab fingers is achieved by varying the number and size of conductors attached to the screw 22 (FIG. 6). This construction then allows varying current carrying capabilities by using only one size stab finger and one size connector but varying the number and size of conductor cables. The stab finger 10 is also interchangeable with stab finger 12 which further reduces the number of different manufactured pieces required for a complete assembly. The conductors are easy to install in the simple, uncluttered motor controller which is kept simple by the absence of insulators on the rear of the stab and insulator assembly. Since the stab fingers are enclosed, additional insulators are not needed. This establishes an uncluttered assembly with a simple conductor path.

Figure 7:
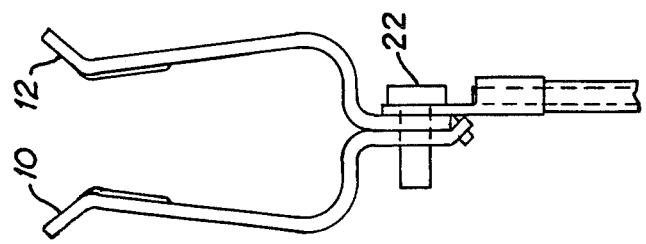
FIG. 7 is a plan view of the inside of the stab housing.

Referring now to FIGS. 7 through 9, the stab housing base 14 has a group of first, second and third upstanding partitions 24, 26, 28 formed on the base. The base is preferably constructed of insulating plastic material as is known in the art. The first partition has a shoulder 30 thereon which is opposite the base and extends from the first partition towards the third partition. The third partition 28 has shoulder 32 thereon opposite the base which extends from the third partition towards the first partition. The second partition is positioned between the first and third partition and defines, pathways 34, 36 between the first and second partitions and between the second and third partitions. The second partition 26 as illustrated in FIG. 7 has a general U-configuration which is a configuration convenient to mold. The bottom of the U could be removed making the second partition two separate partitions. This would yield four partitions with the fourth partition positioned in the pathway now between the second and third partitions and defining a pathway between the third and fourth partitions. It does not matter whether the second partition is a single piece or is divided into two separate partitions, the operation of the assembly remains the same. Of course, for a three-phase system, there would be at least three groups of first, second and third partitions formed in the housing base.

Referring now to FIGS. 10 through 12, the stab housing cover has a group of first and second spaced apart channels 38, 40 formed on the cover. The first channel 38 has a first portion connected to and extending from the cover and a second portion extending from the first portion towards the shoulder of the first partition of the housing. As viewed in FIG. 11, the second portion extends from the first portion towards the left end of the cover. The first partition shoulder 30 slidingly engages the first channel 38 for relative sliding motion between the stab housing base and cover. Similarly, the second channel 40 has a first portion connected to and extending from the cover and a second portion extending from the first portion towards the shoulder of the third partition of the housing. The third partition shoulder 32 slidingly engages the second channel 40 for relative sliding motion between the stab housing base 14 and cover 16. As viewed in FIG. 11, the second portion of the second channel extends toward the right end of the cover.

The cover also includes shutter operating fingers 18 and 20. Each shutter finger extends from the cover in a direction generally parallel to the channels formed therein. Each finger has an elongated configuration and a wedge-shaped tip for operating the shutter mechanism. The shutter fingers extending outwardly more than the stab fingers so that the shutter fingers operate the shutter prior to contact of the stab fingers with the conductors.

The cover also includes a tab 42 which extends from the cover and which has an opening therein for receiving a screw. Preferably, there are two tabs which receive self-tapping screws.

Assembly of the bus bar stab and insulator is simple and straightforward. The base 14 is molded in a single piece and the cover 16 is molded in a single piece. Two of the interchangeable stab fingers 10, 12 are selected and placed together with the tabs in their interlocking position for attachment of the screw 22. The assembled stab fingers 10, 12 are then laid into the base 14 in the pathways 34, 36 defined between the first and second partitions 26, 28 and between the second and third partitions 26, 28. The cover 16 is slid into place by first aligning the channels 38, 40 of the cover 16 with the shoulders 30, 32 of the first and third partitions 24, 28. Once assembled to this stage, the cover slides back and forth easily so that access may be had to the screw holding the fingers together for the attachment of one or more conductors. Once the conductors are attached, self-tapping screws are inserted through the tabs 42 in the cover and opening in the base and mounted to the carriage. It will be appreciated that once the screws are attached to the carriage the cover can no longer slide from the base. This will hold the unit together during use and prevent unintentional access to the fingers.

Operation of the stab assembly is straightforward. After assembly, conductors are simply attached to the stab fingers and the assembly is secured to the carriage. When it is desired to make connection with the bus bars, the carriage and with it the stab assembly, is pushed toward the bus bars. The stab cover fingers 18, 20 which extend beyond the stab fingers 10, 12 are first to contact the shutter mechanism. The wedge-shaped tip of the shutter fingers enables the stab assembly as it is pushed toward the bus bars to wedge in and lift up the shutter mechanism thereby providing an opening for insertion of the stab fingers. As the unit is further pushed toward the bus bars, the shutter opens sufficiently for the stab fingers to make contact with the bus bars. During removal of the carriage, the reverse operation takes place, whereby the stab fingers break contact with the bus bars while the shutter mechanism is open and after contact is broken the shutter fingers release the shutter mechanism which closes preventing inadvertent or unintentional access to the bus bars.

It will now be understood that there has been disclosed an improved stab and insulator assembly for a motor control center or the like. The stab assembly is simple having very few parts with some parts interchangeable. The unit is easy to assemble because it has few parts and uses molded plastic. The current rating of the stab assembly is easily changed by changing the number and size of conductors attached to it and access for changing the number and size of conductors is quite simple. Access is had by sliding the cover forward on the base exposing the screw where conductors are attached. The unit is quite simple requiring only 13 parts including the two screws for mounting it to the carriage.

As will be evident from the foregoing description, certain aspects of the invention are not limited to the particular details of the examples illustrated, and it is therefore contemplated that other modifications or applications will occur to those skilled in the art. It is accordingly intended that the claims cover all such such modifications and applications as do not depart from the true spirit and script of the invention.

What is claimed as new and desired to be secured by Letters Patent of the United States is:

1. A bus bar stab and insulator assembly, comprising:
   a stab housing having a base with a group of first, second and third upstanding partitions formed on the base, the first partition having a shoulder thereon opposite the base and extending from the first partition toward the third partition, the third partition having a shoulder thereon opposite the base and extending from the third partition toward the first partition, the second partition being positioned between the first and third partitions and defining pathways between the first and second partitions and between the second and third partitions;
   a first stab finger positioned in the pathway between the first and second partitions, extending from the housing a preselected distance, and having first and second end portions, the first end portion having an opening therein and a first tab extending from the first end portion in a first direction;
   a second stab finger having first and second end portions, the first end portion having an opening therein and a second tab extending therefrom in a second direction, opposite the first direction;
   a screw extending through the openings, with the first and second tabs in interlocking engagement; and
   a stab housing cover having a group of first and second spaced apart channels formed on the cover, the first channel defined by a first portion connected to, and extending from the cover and a second portion extending from the first portion towards the shoulder of the first partition of the housing, the shoulder of the first partition slidingly engaging the first channel for relative sliding motion between the stab housing base and cover, the second channel defined by a first portion connected to and extending from the cover and a second portion extending from the first portion towards the shoulder of the first partition of the housing, the shoulder of the third partition slidingly engaging the second channel for relative sliding motion between the stab housing base and the cover.

2. A bus bar stab and insulator assembly according to claim 1, wherein the second end portion of the first and second stab fingers are each bifurcated to form two contact legs.

3. A bus bar stab and insulator assembly according to claim 2, wherein each contact leg has a contact thereon facing in the direction of the respective tab.

4. A bus bar stab and insulator assembly according to claim 1, wherein each finger is constructed of tempered copper alloy to provide a spring effect.

5. A bus bar stab and insulator assembly according to claim 1, including a fourth partition positioned in the pathway between the second and third partitions and defining a pathway between the third and fourth partitions.

6. A bus bar stab and insulator assembly according to claim 1, including a shutter finger extending from the cover in a direction generally parallel to the channels and having an elongated configuration and a wedge shaped tip.

7. A bus bar stab and insulator assembly according to claim 6, wherein the shutter finger has a length sufficient for operating a shutter of a motor control center.

8. A bus bar stab and insulator assembly according to claim 1, including an insulating tab extending from the cover and having an opening therein for receiving a screw.

9. A bus bar stab assembly, comprising:
   a first stab finger having first and second end portions, the first end portion having an opening therein and a tab extending therefrom in a first direction;
   a second stab finger having first and second end portions, the first end portion of the second stab finger having an opening therein and a first tab and a second tab extending therefrom in a second direction opposite the first direction, wherein the first and second tabs are adapted to engage the tab of the first stab finger; and
   a screw extending through the openings with the tabs in interlocking engagement.

10. A bus bar stab assembly according to claim 9, wherein the second end portion of the first and second stab fingers are each bifurcated to form two contact legs.

11. A bus bar stab assembly according to claim 10, wherein each bifurcation has a contact thereon facing in the direction of the respective tab.

12. A bus bar stab assembly according to claim 9, wherein each finger is constructed of tempered copper alloy to provide a spring effect.

13. A bus bar stab and insulator assembly, comprising:
   a stab housing having a base having a group of first, second and third upstanding partitions formed on the base, the first partition having a shoulder thereon opposite the base extending from the first partition toward the third partition, the third partition having a shoulder thereon opposite the base extending from the third partition toward the first partition, the second partition being positioned between the first and third partitions and defining pathways between the first and second partitions and between the second and third partitions; and a stab housing cover having a group of first and second spaced apart channels formed on the cover, the first channel defined by a first portion connected to, and extending from the cover and a second portion extending from the first portion towards the shoulder of the first partition of the housing, the shoulder of the first partition slidingly engaging the first channel for relative sliding motion between the stab housing base and cover, the second channel defined by a first portion connected to and extending from the cover and a second portion extending from the first portion towards the shoulder of the third partition of the housing, the shoulder of the third partition slidingly engaging the second channel for relative sliding motion between the stab housing and the cover.

14. A bus bar stab and insulator assembly according to claim 13, including a second and third group of first, second and third partitions.

15. A bus bar stab and insulator assembly according to claim 13, including a fourth partition positioned in the pathway between the second and third partitions and defining a pathway between the third and fourth partitions.

16. A bus bar stab and insulator assembly according to claim 13, including a shutter finger extending from the cover in a direction generally parallel to the channels and having an elongated configuration and a wedge shaped tip.

17. A bus bar stab and insulator assembly according to claim 16, wherein the shutter finger has a length sufficient for operating a shutter of a motor control center.

18. A bus bar stab and insulator assembly according to claim 13, including an insulating tab extending from the cover and having an opening therein for receiving a screw.

* * * * *